United States Patent [19]

Corne et al.

[11] Patent Number: 4,709,982

[45] Date of Patent: Dec. 1, 1987

[54] GELLED OIL FILLING COMPOUNDS

[75] Inventors: Robert W. Corne; John M. R. Hagger, both of London, England

[73] Assignee: BICC Public Limited Company, United Kingdom

[21] Appl. No.: 797,618

[22] Filed: Nov. 13, 1985

[30] Foreign Application Priority Data

Nov. 27, 1984 [GB] United Kingdom ............... 8429878

[51] Int. Cl.$^4$ ................................. G02B 6/44
[52] U.S. Cl. ............................. 350/96.23; 174/23 C; 523/173; 524/474; 524/505
[58] Field of Search ............... 350/96.23; 174/23 C; 523/173; 524/474, 476, 490, 491, 505

[56] References Cited

U.S. PATENT DOCUMENTS

| | | | |
|---|---|---|---|
| 4,324,453 | 4/1982 | Patel | 350/96.23 |
| 4,369,284 | 1/1983 | Chen | 524/476 |
| 4,464,013 | 8/1984 | Sabia | 350/96.23 |
| 4,497,538 | 2/1985 | Patel | 350/96.23 |
| 4,509,821 | 4/1985 | Stenger | 350/96.23 |
| 4,617,422 | 10/1986 | Hagger | 174/23 C |

FOREIGN PATENT DOCUMENTS

| | | |
|---|---|---|
| 0058022 | 8/1982 | European Pat. Off. |
| 2021612A | 12/1979 | United Kingdom |
| 2092176A | 8/1982 | United Kingdom |
| 2109949A | 6/1983 | United Kingdom |
| 2131045A | 6/1984 | United Kingdom |
| 2168991A | 7/1986 | United Kingdom |

OTHER PUBLICATIONS

Shell Chemical Co., Technical Bulletin SC:72–78: Solution Behaviour of Kraton G Thermoplastic Rubber (Jul. 1978).
Shell Chemical Co., Booklet: Kraton Thermoplastic Rubber: Typical Properties Kraton D: Kraton G. (Oct. 1982), Bulletin SC: 68–82.

*Primary Examiner*—John Lee
*Attorney, Agent, or Firm*—Parkhurst & Oliff

[57] ABSTRACT

A gelled oil filling compound primarily intended for optical cables which meets the standard drainage test at 70° C. and is stable to prolonged exposure at −40° C. consists essentially of a low aromatic hydrocarbon oil and a block copolymer with a molecular weight in the range 200,000 to 2,000,000. The block copolymer comprises at least one segment tending to confer solubility in the oil and at least one segment tending to inhibit it, the preferred example being the polymer sold under the trade mark KRATON G1651 which has a center segment which is a random copolymer of ethylene and butylene and two end segments consisting essentially of styrene units.

8 Claims, No Drawings

4,709,982

GELLED OIL FILLING COMPOUNDS

This invention relates to gelled-oil filling compounds that are primarily intended for filling the spaces within optical fibre cables to inhibit penetration of water or water vapour, though they can also be used in electric communication cables; it also relates to cables in which the compounds are used.

The requirements of filling compounds for optical cables are not easily satisfied: throughout the installation and working temperature range of the cable, which should extend at least from −40° to +70° C., they must
remain stable;
wet all the solid materials which they contact without having a deleterious effect on any of them;
be cohesive enough to ensure that bending of the cable at a radius of a few decimetres or less will not result in the formation of voids in the compound or at its surface;
be soft enough to allow such bending without subjecting the optical fibres to any significant strain (since strain causes signal attenuation);
and yet
resist flow under gravity and/or the hydrostatic pressures liable to be applied to the cable if one of its ends is exposed in a flooded manhole:
whereas at a temperature higher than the working temperature range but not so high as to injure any of the components of the cable (usually not higher than 150° C. and sometimes much lower) they must be mobile enough for the cable to be formed and completely filled with the compound without risk of breaking or overstressing the optical fibres.

The problem of cable formation is particularly severe when the compound is used to fill a fibre-enclosing tube of an oriented polymeric material such as polyethylene terephthalate (sold under the trade mark Arnite), as the orientation process entails extruding the tube oversize, typically twice final cross-sectional area, and drawing it down to final size at the appropriate temperature for orientation—about 115° C. in the case of polyethylene terephthalate—so that large speed differentials between the fibres and the compound arise in the draw-down region and may apply excessive drag forces to the fibres if the compound is too viscous.

Currently known filling compounds for use in optical cables include some based on a mineral oil or other hydrocarbon oil gelled with a block copolymer comprising at least one molecular segment that tends to confer solubility in the oil and at least one molecular segment of different constitution that tends to inhibit solubility in the oil (the proportions of the different molecular segments being chosen in the range appropriate to secure gel formation).

As far as the applicant is aware, the only such block copolymers actually used have been two very similar polymers, sold by Shell Chemicals Limited under the trade mark KRATON as KRATON G1650 and KRATON G1652. These are both three-segment linear block copolymers with weight average molecular weights (as estimated in solution by gel permeation chromatography standardised with reference to and expressed as polystyrene) of 105,000±2,000 and 89,000±1,000 respectively, the centre segment being a hydrogenated polybutadiene, randomly 1,2 and 1,4, and the end segment of styrene and the ratio of styrene to hydrogenated butadiene being about 3:7 by weight.

In order to get compounds with adequate flow resistance, it has been necessary to add a further polymer (typically polyethylene or polypropylene), and by this means it has been possible to design compounds that resist drainage from the fibre-enclosing tube at temperatures up to 70° C.; but such compounds tend to exude oil especially at low temperatures.

Since the gel-forming property of these block copolymers is attributable to the conflicting solubility characteristics of the segments, it has not been thought that mere alteration of the length of the segments (the molecular weight) could have any beneficial effect on the properties of gelled-oil filling compounds; block copolymers of higher molecular weight have been considered, but rejected, for use in much higher proportions in oil-based coating compositions for optical fibres (GB-A-2109949). Surprisingly we have found that by using a block copolymer of much higher molecular weight a compound can be made that resists drainage at 70° C. without requiring any additional polymer and that (we believe at least partly as a direct result of omitting the additional polymer) the compound gel stability down to −40° C. is greatly enhanced.

In accordance with the invention, a gelled oil filling compound comprises a hydrocarbon oil with an aromatic content (expressed as percentage of aromatic ring carbon atoms to total carbon atoms) not greater than 12% and, as the only polymeric constituent present in any significant amount, a block copolymer having at least one molecular segment that tends to confer solubility in the oil and at least one molecular segment that tends to inhibit solubility in the oil, the proportion of the segments being such that the block copolymer forms a gel with oil, the weight average molecular weight of the block copolymer being in the range 200,000 to 2,000,000 and the quantity of block copolymer being within the range 1–10% and sufficient for the compound to resist drainage at up to 70° C. but not so high that the viscosity of the compound at 120° C. is greater than 1000 cp.

For the purposes of the invention, a compound is considered to resist drainage if there is no visible sign of drainage or dripping from a filled length of oriented polyethylene terephthalate tube 150 mm long, 0.9 mm in internal diameter and 1.5 mm in outside diameter after suspending vertically in a chamber at the test temperature for 24 hours.

The aromatic content of the oil is preferably below 10%, more especially below 6%, and ideally substantially zero. The oil is preferably a mineral oil of suitably low aromatic content; the naphthenic/paraffinic ratio is of secondary but significant importance. Highly paraffinic oils are more easily gelled but some oils of low pour point with a relatively high naphthenic content, when satisfactorily gelled (by using a higher content of the block copolymer) are found to produce filling compounds with a greatly reduced tendency to separate oil at low temperatures. Oils that are considered suitable include the following:

|  | Typical Analysis (% of C atoms) | | |
| --- | --- | --- | --- |
|  | Aromatic | Naphthenic | Paraffinic |
| From Burmah-Castrol plc: | | | |
| Puremor# WOT 14 | 0 | 35 | 65 |
| Poly-X H51 | 9 | 40 | 51 |
| Poly-X M51P | 11 | 31 | 58 |
| From Shell U.K. Ltd: | | | |
| Edelex 27 | 1 | 46 | 53 |

-continued

| | Typical Analysis (% of C atoms) | | |
|---|---|---|---|
| | Aromatic | Naphthenic | Paraffinic |
| From Witco Chemical Co: | | | |
| Blandol | 0 | 35 | 65 |
| From Astor Chemicals Ltd: | | | |
| DY 3144 | 0 | 35 | 65 |
| From Nynas Ltd: | | | |
| Nyflex 10 | 10 | 44 | 46 |
| From J. O. Buchanan & Co. Ltd: | | | |
| Solvent 70 Neutral | 7 | not known | |
| From BP Chemicals Ltd: | | | |
| Enerpar 20 | 10 | 31 | 59 |

(These analyses are taken from manufacturers' published data but are thought to be obtained by the method of ASTM-D2140).

Preferably the (or each) molecular segment tending to confer solubility in the oil is an aliphatic hydrocarbon segment, a preferred example being hydrogenated polybutadiene.

Preferably the (or each) mulecular segment tending to inhibit solubility in the oil is a hydrocarbon segment with a substantial aromatic content, a preferred example being polymerised styrene.

Preferably the block copolymer is linear and consists of a central segment tending to confer solubility in the oil and two end segments tending to inhibit it.

More especially, we prefer to use as the block copolymer the one sold by Shell Chemicals Limited under the designation KRATON G1651, which resembles KRATON G1650 and G1652 in the characteristics described above except that its weight average molecular weight (by the gel permeation chromatography technique referred to above) is estimated as 238,000±4000.

The quantity of copolymer required needs to be determined empirically for each oil/polymer combination, as the range that gives satisfactory results with an individual oil will be much narrower than the 1–10% range for oils generally. In the case of Kraton G 1651, highly paraffinic oils require around 2%, low-aromatic oils with significant naphthenic content around 4%, while oils approaching the 12% aromatic content limit are likely to need around 7–10%. Insufficient concentration will result in a compound that fails the drainage test while excessive concentration will result in a compound that is too hard at service temperatures and/or too viscous at application temperatures.

EXAMPLE A

A filling compound consisting of nothing but 100 parts white technical oil (Puremor WOT 14), 2 parts of the preferred block copolymer (KRATON G1651) and 0.3% parts Permanax WSP (antioxidant) resists drainage at 70° C. and is stable at −40° C. It can be filled at about 140°–150° C. into an oversize polyethylene terephthalate tube as it is extruded over an optical fibre, and after cooling to about 110°–120° C. is sufficiently mobile to permit drawing down of the tube in a ratio of cross-sectional area of 2:1 at that temperature for the purpose of orientation, without risk of fibre breakage.

Tables 1–3 compare Example A (except that the antioxidant was omitted) with comparison compositions as follows:

Table 1 Compares Example A with similar compositions (1–3) containing insufficient amounts of the block copolymer to resist drainage at 70° C.;

Table 2 Compares it with compositions (4–8) in which Kraton G1650 or G1652 is used as the sole polymeric constituent; and Table 3 Compares it with compositions (9–11) containing an additional polymeric ingredient. In Table 3, Elexar 8431Z is a blend, sold by Shell Chemicals Limited under their Trade Mark Elexar, consisting essentially of Kraton G (of undisclosed molecular weight) with polypropylene; KM6100 designates a grade of polypropylene of melt index 3.5 from the same supplier; and Astor FO 8471 is a high molecular weight polyethylene wax sold by Astor Chemicals Limited.

Properties shown in the tables were determined as follows:

Viscosity: by a Brookfield viscometer using Spindle No. 1 at 10 r.p.m.

Cone Penetrations By Institute of Petroleum test IP-179.

Drop Point: by Institute of Petroleum test IP-31.

Oil separation: Cone test by Telecom Australia Specification LC9; dish test by measuring the free oil formed on the surface of an 0.25 dm3 sample of compound in a dish of 92 mm diameter.

Drainage: by the vertical tube test described above.

TABLE 1

| | Comparison Composition | | | |
|---|---|---|---|---|
| | 1 | 2 | 3 | Example A |
| WOT-14 Oil | 100 | 100 | 100 | 100 |
| Kraton G1650 | | | | |
| Kraton G1651 | 1.0 | 1.5 | 1.7 | 2.0 |
| Kraton G1652 | | | | |
| Elexar 8431Z | | | | |
| KM 6100 | | | | |
| Astor FO 8471 | | | | |
| Viscosity (cp) @ | | | | |
| 100° C. | 200 | >1000 | — | — |
| 110° C. | 36 | 400 | >1000 | >1000 |
| 120° C. | 15 | 49 | 200 | 90 |
| 130° C. | <10 | 17 | 22 | 59 |
| 140° C. | — | <10 | 13 | 25 |
| Cone Penetration @ (tenths of mm) | | | | |
| −20° C. | 298 | 269 | — | 259 |
| −40° C. | — | — | — | 169 |
| Drop Point (°C.) | 70 | 82 | — | 88 |
| Oil Separation (%), −20° C. | | | | |
| (Dish Test) | | | | |
| 7 days | 1.5 | 1.5 | — | 1.0 |
| 14 days | — | — | — | 1.5 |
| (Cone Test) | | | | |
| 7 days | — | — | — | 10.0 |
| 14 days | — | — | — | 18.0 |
| Drainage Test | Fail | Fail | Fail | Pass |

TABLE 2

| | Example A | Comparison Compositions | | | | |
|---|---|---|---|---|---|---|
| | | 4 | 5 | 6 | 7 | 8 |
| WOT-14 Oil | 100 | 100 | 100 | 100 | 100 | 100 |
| Kraton G1650 | | 2.0 | | 4.0 | | 8.0 |
| Kraton G1651 | 2.0 | | | | | |
| Kraton G1652 | | | 2.0 | | 4.0 | |
| Elexar 8431Z | | | | | | |
| KM 6100 | | | | | | |
| Astor FO 8471 | | | | | | |
| Viscosity (CP) @ | | | | | | |
| 100° C. | — | <10 | <10 | 28 | 25 | 37 |
| 110° C. | 1000 | — | — | — | — | 30 |
| 120° C. | 900 | — | — | — | — | 25 |
| 130° C. | 59 | — | — | — | — | 21 |
| 140° C. | 25 | — | — | — | — | 20 |

TABLE 2-continued

|  | Example A | Comparison Compositions |  |  |  |  |
|---|---|---|---|---|---|---|
|  |  | 4 | 5 | 6 | 7 | 8 |
| Cone Penetration @ (tenths of mm) |  |  |  |  |  |  |
| −20° C. | 259 | — | — | — | — | — |
| −40° C. | 169 | — | — | — | — | — |
| Drop Point (°C.) | 88 | 40 | 30 | — | — | 48 |
| Oil Separation (%), −20° C. |  |  |  |  |  |  |
| (Dish Test) |  |  |  |  |  |  |
| 7 days | 1.0 | — | — | — | — | — |
| 14 days | 1.5 | — | — | — | — | — |
| (Cone Test) |  |  |  |  |  |  |
| 7 days | 10.0 | — | — | — | — | — |
| 14 days | 18.0 | — | — | — | — | — |
| Drainage Test | Pass | Fail | Fail | Fail | Fail | Fail |

TABLE 3

|  | Example A | Comparison Compositions |  |  |
|---|---|---|---|---|
|  |  | 9 | 10 | 11 |
| WOT-14 Oil | 100 | 100 | 100 | 100 |
| Kraton G1650 |  |  |  |  |
| Kraton G1651 | 2.0 |  | 1.5 | 1.5 |
| Kraton G1652 |  |  |  |  |
| Elexar 8431Z |  | 4.0 |  |  |
| KM 6100 |  |  | 1.0 |  |
| Astor FO 8471 |  |  |  | 1.0 |
| Viscosity (cp) @ |  |  |  |  |
| 100° C. | — | — | >1000 | — |
| 110° C. | >1000 | >1000 | 580 | >1000 |
| 120° C. | 900 | 380 | 85 | 70 |
| 130° C. | 59 | 78 | 28 | 19 |
| 140° C. | 25 | 24 | 15 | <10 |
| Cone Penetration @ (tenths of mm) |  |  |  |  |
| −20° C. | 259 | 251 | 287 | 262 |
| −40° C. | 169 | 134 | — | — |
| Drop Point (°C.) | 88 | 70 | 84 | 84 |
| Oil Separation (%), −20° C. |  |  |  |  |
| (Dish Test) |  |  |  |  |
| 7 days | 1.0 | 11.0 | 9.0 | 1.5 |
| 14 days | 1.5 | 20.0 | — | — |
| (Cone Test) |  |  |  |  |
| 7 days | 10.0 | 47.0 | — | — |
| 14 days | 18.0 | 60.0 | — | — |
| Drainage Test | Pass | Variable | Fail | Fail |

FURTHER EXAMPLES

The remaining examples illustrate the use of alternative base oils with higher naphthenic and/or aromatic content than WOT 14. Blandol and DY 3144 were not used in the examples because they resemble WOT 14 so closely that practically identical results would be expected.

Tables 4 and 5 show the effect of substituting the oils indicated without otherwise altering the composition of Example A; in all cases the drainage test was failed because of the reduced gelling tendency in these oils (attributable to the tendency of cyclic hydrocarbon molecules to saturate the aromatic portions of the copolymer).

TABLE 4

|  | Example A | Comparison Compositions |  |  |
|---|---|---|---|---|
|  |  | 12 | 13 | 14 |
| WOT-14 Oil | 100 |  |  |  |
| Edelex 27 Oil |  | 100 |  |  |
| Enerpar 20 Oil |  |  | 100 |  |
| Nyflex 10 Oil |  |  |  | 100 |
| Solvent 70 neutral Oil |  |  |  |  |
| Poly-X H51 Oil |  |  |  |  |
| Poly-X M51P Oil |  |  |  |  |
| Kraton G 1651 | 2.0 | 2.0 | 2.0 | 2.0 |
| Viscosity (cp) @ |  |  |  |  |
| 100° C. | — | 270 | 850 | 11 |
| 110° C. | >1000 | 25 | 50 | <10 |
| 120° C. | 900 | <10 | 13 |  |
| 130° C. | 59 | — | <10 | — |
| 140° C. | 25 | — | — | — |
| Oil Separation (%), −20° C. |  |  |  |  |
| (Cone Test) |  |  |  |  |
| 7 days | 10.0 | 0 | 5.0 | 0 |
| 14 days | 18.0 | 0 | 11.0 | 0 |
| Drainage Test | Pass | Fail | Fail | Fail |

TABLE 5

|  | Example A | Comparison Compositions |  |  |
|---|---|---|---|---|
|  |  | 15 | 16 | 17 |
| WOT-14 Oil | 100 |  |  |  |
| Edelex 27 Oil |  |  |  |  |
| Enerpar 20 Oil |  |  |  |  |
| Nyflex 10 Oil |  |  |  |  |
| Solvent 70 neutral Oil |  | 100 |  |  |
| Poly-X H51 Oil |  |  | 100 |  |
| Poly-X M51P Oil |  |  |  | 100 |
| Kraton G 1651 | 2.0 | 2.0 | 2.0 | 2.0 |
| Viscosity (cp) @ |  |  |  |  |
| 100° C. | — | 70 | 11 | 11 |
| 110° C. | >1000 | 10 | <10 | <10 |
| 120° C. | 900 | <10 | — | — |
| 130° C. | 59 | — | — | — |
| 140° C. | 25 | — | — | — |
| Oil Separation (%), −20° C. |  |  |  |  |
| (Cone Test) |  |  |  |  |
| 7 days | 10.0 | 20.0 | 5.0 | — |
| 14 days | 18.0 | 32.0 | 7.0 | — |
| Drainage Test | Pass | Fail | Fail | Fail |

Tables 6, 7 and 8 illustrate, for three of the alternative oils, the effect of increasing copolymer content, and show that satisfactory compositions can be achieved at some level within the 1–10% range in all these cases:

TABLE 6

|  | Comparison Compositions |  | Example B |
|---|---|---|---|
|  | 12 | 18 |  |
| Edelex 27 Oil | 100 | 100 | 100 |
| Kraton G 1651 | 2.0 | 2.5 | 3.0 |
| Viscosity (cp) @ |  |  |  |
| 100° C. | 270 | >1000 | >1000 |
| 110° C. | 25 | 86 | 250 |
| 120° C. | <10 | 15 | 38 |
| 130° C. | — | 10 | 17 |
| 140° C. | — | — | — |
| Oil Separation (%), −20° C. |  |  |  |
| (Cone Test) |  |  |  |
| 7 days | 0 | 0 | 0 |
| Drainage Test | Fail | Fail | Pass |

TABLE 7

|  | Comparison Composition 13 | Example C | Example D |
|---|---|---|---|
| Enerpar 20 Oil | 100 | 100 | 100 |
| Kraton G 1651 | 2.0 | 2.5 | 3.0 |

TABLE 7-continued

|  | Comparison Composition 13 | Example C | Example D |
|---|---|---|---|
| Viscosity (cp) @ |  |  |  |
| 100° C. | 850 | >1000 | — |
| 110° C. | 50 | 160 | >1000 |
| 120° C. | 13 | 22 | 54 |
| 130° C. | <10 | 10 | 16 |
| 140° C. | — | — | — |
| Oil Separation (%), −20° C. (Cone Test) |  |  |  |
| 5 days | <5 | 8.6 | 9.2 |
| Drainage Test | Fail | Pass | Pass |

TABLE 8

|  | Comparison Compositions | | | Example E |
|---|---|---|---|---|
|  | 14 | 15 | 16 |  |
| Nyflex 10 Oil | 100 | 100 | 100 | 100 |
| Kraton G 1651 | 2.0 | 3.0 | 4.0 | 7.0 |
| Viscosity (cp) @ |  |  |  |  |
| 100° C. | 11 | 34 | 90 | >1000 |
| 110° C. | <10 | 24 | 54 | 920 |
| 120° C. | — | 19 | 40 | 240 |
| 130° C. | — | 15 | — | 130 |
| 140° C. | — | — | — | 87 |
| Oil Separation (%), −20° C. (Cone Test) |  |  |  |  |
| 7 days | 0 | — | — |  |
| Drainage Test | Fail | Fail | Fail | Pass |

What we claim as our invention is:

1. A gelled oil filling compound comprising a hydrocarbon oil with an aromatic content not greater than 12% and, as the only substantial polymeric constituent, a block copolymer having at least one molecular segment that tends to confer solubility in the oil and at least one molecular segment that tends to inhibit solubility in the oil, the proportion of the segments being such that the block copolymer forms a gel with the oil, wherein the weight average molecular weight of the block copolymer is in the range 200,000 to 2,000,000 and the quantity of block copolymer being so chosen from the range 1–10% that the compound resists drainage at temperatures up to 70° C. but has a viscosity at 120° C. not greater than 1000 cp.

2. A filling compound as claimed in claim 1 in which the aromatic content of the oil is less than 6%.

3. A filling compound as claimed in claim 1 in which the aromatic content of the oil is substantially zero.

4. A filling compound as claimed in claim 1 in which said molecular segment tending to confer solubility in the oil is an aliphatic hydrocarbon segment.

5. A filling compound as claimed in claim 1 in which said molecular segment tending to inhibit solubility in the oil is a hydrocarbon segment with a substantial aromatic content.

6. A filling compound as claimed in claim 1 in which said molecular segment tending to confer solubility in the oil is a hydrogenated polybutadiene segment and said molecular segment tending to inhibit solubility in the oil is polymerised styrene.

7. A filling compound as claimed in claim 6 in which said block copolymer (i) consists of a single central said segment tending to confer solubility and two end segments each being a said segment tending to inhibit solubility and (ii) has a weight average molecular weight of about 238,000.

8. A cable filled with the filling compound claimed in claim 1.